United States Patent [19]

Nachtman

[11] 4,006,972
[45] Feb. 8, 1977

[54] LASER MIRROR COOLANT PRESSURE BALANCE MEANS

[75] Inventor: Russell L. Nachtman, North Palm Beach, Fla.

[73] Assignee: United Technologies Corporation, Hartford, Conn.

[22] Filed: May 12, 1975

[21] Appl. No.: 576,492

[52] U.S. Cl. ............................. 350/310; 350/288
[51] Int. Cl.² ........................................ G02B 5/08
[58] Field of Search ............ 350/310, 288; 126/271

[56] References Cited
UNITED STATES PATENTS

| | | | |
|---|---|---|---|
| 1,530,441 | 3/1925 | Thomson | 350/310 |
| 3,854,800 | 12/1974 | Dye et al. | 350/310 |

*Primary Examiner*—John K. Corbin
*Assistant Examiner*—Jon W. Henry
*Attorney, Agent, or Firm*—Jack N. McCarthy

[57] ABSTRACT

A cooled laser mirror assembly and mounting structure wherein a laser mirror is mounted in a housing with a coolant flow transfer tube assembly extending into the mirror with its outer portion being fixedly connected to the mounting structure. Said coolant flow transfer tube assembly providing for a coolant flow into and out of the mirror without providing a direct coolant pressure loading into the mirror. Passage means connects the inner end of the coolant flow transfer tube to passages adjacent the reflecting surface of the mirror.

7 Claims, 5 Drawing Figures

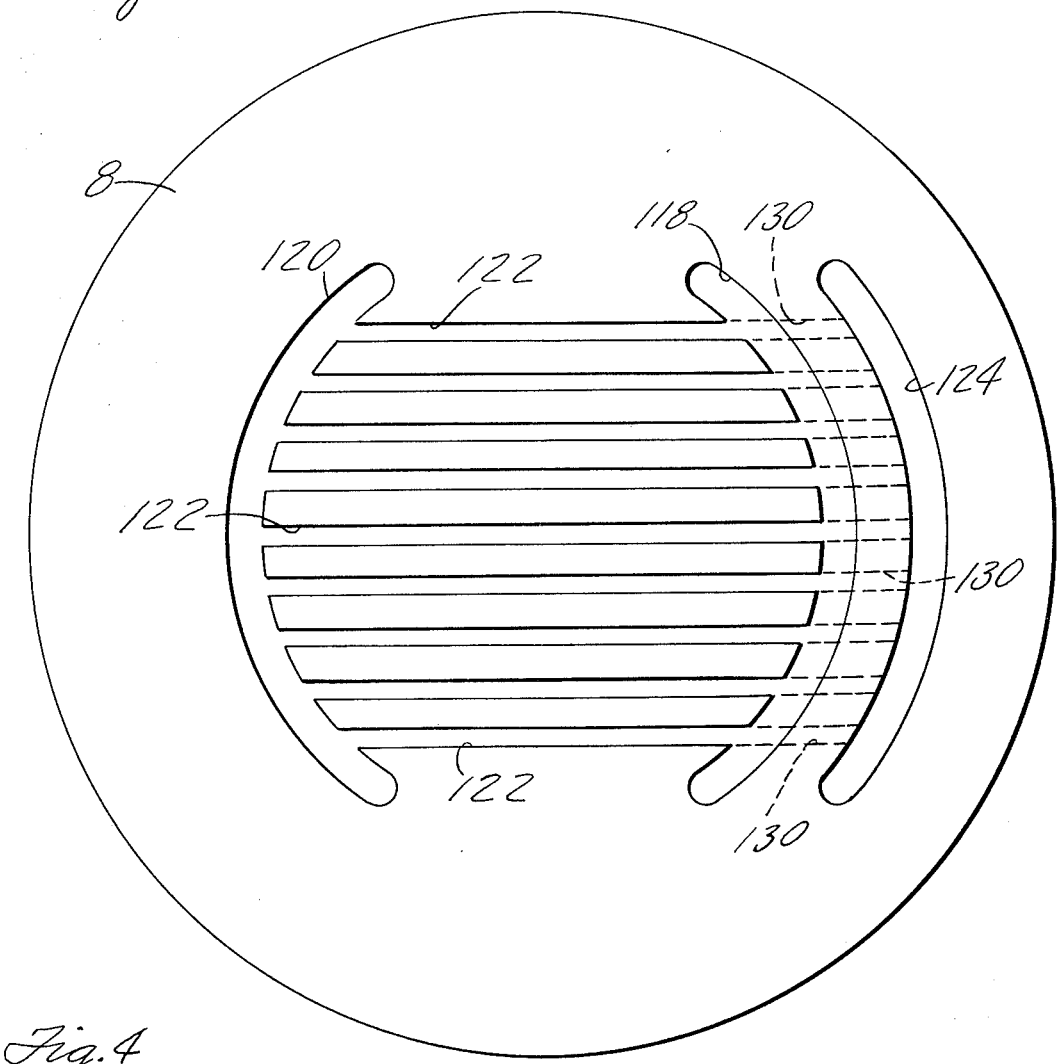
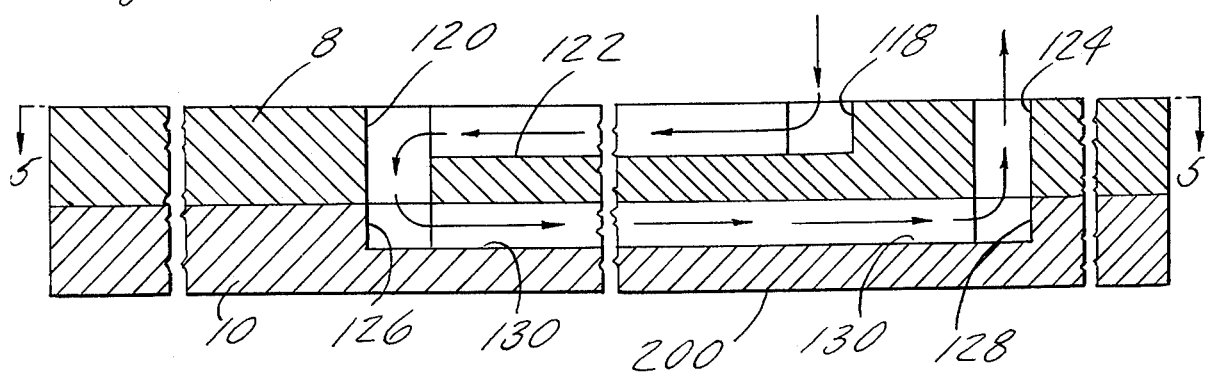

LASER MIRROR COOLANT PRESSURE BALANCE MEANS

The invention herein described was made in the course of or under a contract or subcontract with the Department of the Air Force.

BACKGROUND OF THE INVENTION

Two patents showing prior art ways of directing a coolant fluid into a laser mirror are shown in U.S. Pat. No. 3,637,296 and 3,854,799.

SUMMARY OF THE INVENTION

A primary object of the present invention is to transfer a coolant fluid from its source through the mirror assembly and out without introducing any load into the mirror.

In accordance with the present invention the mirror assembly is formed so that a coolant fluid can be directed into and out of the mirror without introducing a fluid pressure load into the mirror.

In accordance with the present invention a mirror assembly is formed wherein the mirror can be adjusted varying its position with respect to the coolant transfer tube which directs the coolant into and out of the mirror without introducing a direct load into the mirror.

Further, in accordance with the present invention, a flow transfer tube assembly is provided having an outer tube with a spherical end mounted in fixed structure externally of the mirror, an intermediate tube being mounted within said outer tube with a degree of floating movement offering no resistance to small axial movements, and a long slender flexible rod extending through the intermediate tube with one end fixed to the outer tube at its spherical end with the other end providing a cylindrical member at the free end of the flow transfer assembly.

BRIEF DESCRIPTION OF THE DRAWINGS

FIG. 4 is an enlarged fragmentary sectional view of the two cover plates of the mirror assembly.

FIG. 5 is a view taken along the line 5—5 of FIG. 4 showing the inner face of the two cover plates.

DESCRIPTION OF THE PREFERRED EMBODIMENT

Figure 1:
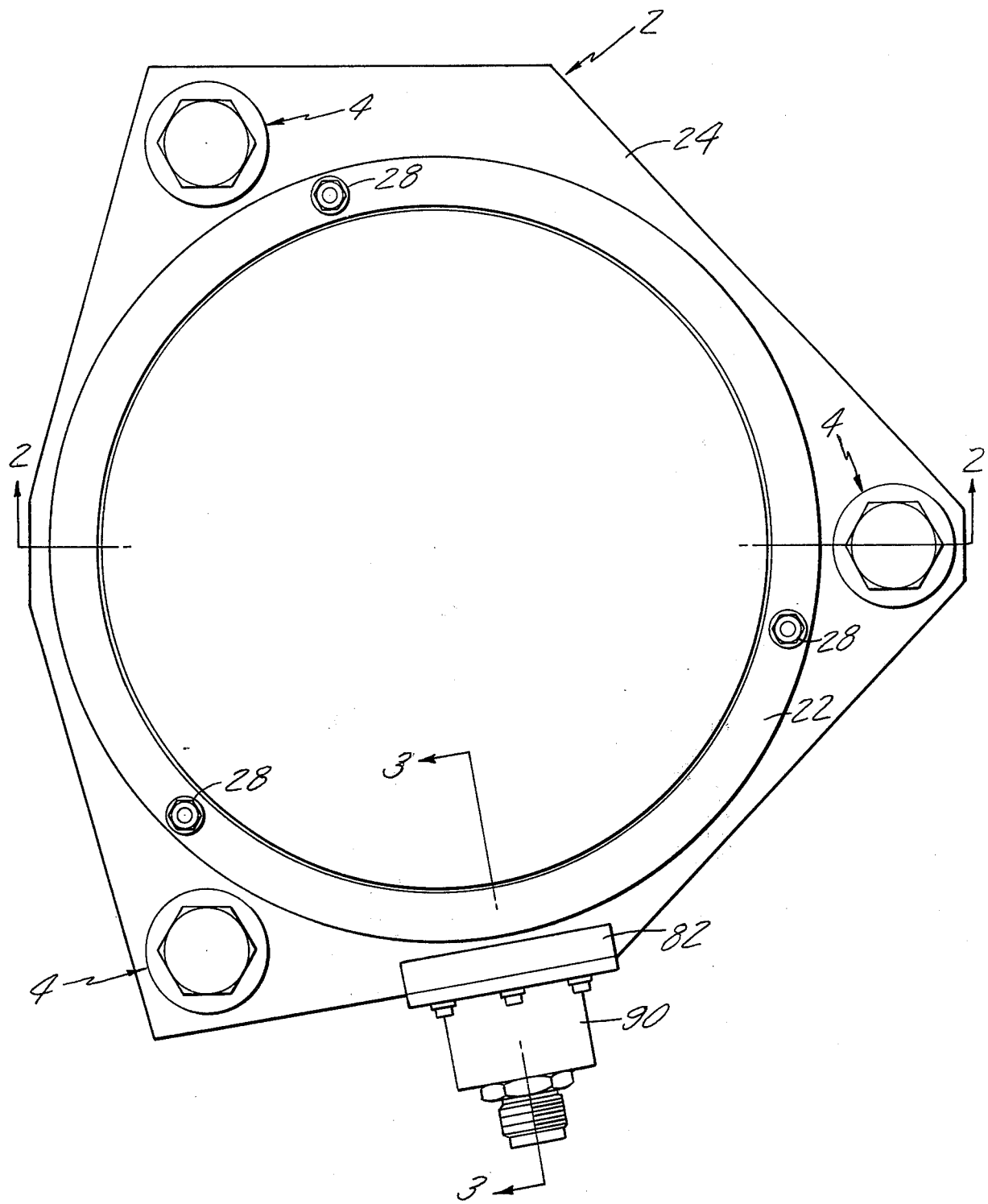
FIG. 1 is a front view of a laser mirror assembly and housing installation.
Figures 2, 3:
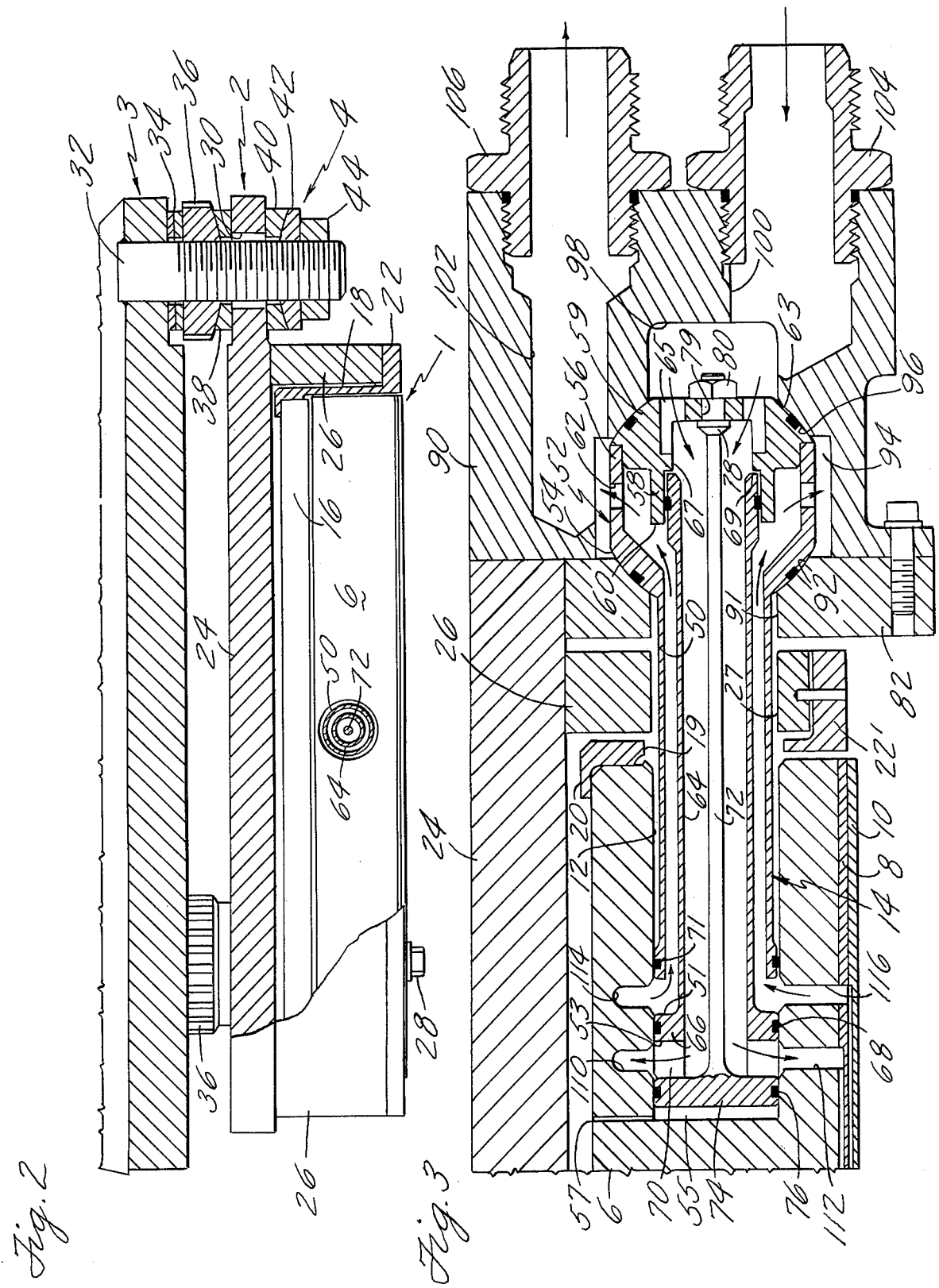
FIG. 2 is a view taken along the line 2—2 of FIG. 1 showing the structure on which the laser mirror assembly and its housing is mounted.
FIG. 3 is an enlarged view taken along the line 3—3 of FIG. 1 showing the transfer tube assembly connected between the mirror assembly and housing.

The laser mirror assembly 1 is mounted on a housing means 2 which is in turn fixedly positioned to a fixed structure 3 by three adjustable mounting bolt assemblies 4.

The laser mirror assembly 1 comprises a backing member 6 with two cover plates 8 and 10 mounted thereon. A similar reflecting device is shown in U.S. Pat. No. 3,637,296, referred to above. A cylindrical opening 12 is located extending radially inwardly from approximately the center of the periphery of the backing plate 6 through which coolant flow is directed towards and away from the mirror assembly by a transfer tube assembly 14.

The backing member 6 of the laser mirror assembly 1 is circular and has a reduced section 16 at its inner end which has a press fit in the bottom part of a cylindrical mounting member 18. The bottom of the backing plate rests against an inwardly extending annular flange 20. The cylindrical mounting member 18 extends to a point adjacent the two cover plates 8 and 10 and has an outwardly extending flange 22 extending therearound. Except for the press fit, the cylindrical mounting member 18 is spaced from the remainder of the laser mirror assembly.

The housing means 2 includes a mounting plate 24 with a cylindrical housing ring 26 fixed to and extending therefrom. The housing ring 26 can be fixed to the mounting plate 24 by any means desired. The housing ring 26 extends outwardly from the mounting plate 24 a sufficient distance so that the laser mirror assembly 1 can be mounted therein with the surface of the outwardly extending flange 22 engaging the surface of the housing ring 26, leaving the bottom of the laser mirror assembly 1 spaced from the mounting plate 24 and the outer surface of the cylindrical member 18 spaced from the housing ring 26. A plurality of bolts 28 extend through the flange 22 into the housing ring 26 to fixedly position the laser mirror assembly therewith.

Mounting plate 24 is contoured so as to have three mounting holes 30 thereon located 120° apart for fixing the housing means 2 to the fixed structure 3. This is done in each case by an adjustable mounting bolt assembly 4. Each adjustable mounting bolt assembly 4 comprises a bolt 32 which extends outwardly from the fixed structure 3 to extend through a mounting hole 30. A plurality of shims 34 are located around each bolt 32 adjacent the fixed structure 3 while a nut 36 is positioned thereon to provide a spherical surface at a desired position facing the mounting plate 24. A washer 38 is mounted between the nut 36 and the mounting plate 24 with a mating spherical seat engaging said spherical surface.

A washer 40, similar to washer 38, is mounted on the opposite side of mounting plate 24 with its spnerical seat facing outwardly, a nut 42, similar to nut 36, is threadably mounted on the bolt 32 with a spherical surface engaging the spherical seat of washer 40. A locknut 44 is placed over the bolt 32 to hold the mounting bolt assembly 4 in place. It can be seen that this mounting construction permits a mounting tolerance between the bolts 32 and the holes 30 in the mounting plate 24.

The transfer tube assembly 14 which directs the coolant flow towards and away from the mirror assembly has one end sealably engaging the interior of the cylindrical opening 12 while the other end has an enlarged head portion which is fixedly mounted to the housing means 2 in a manner to be hereinafter described. An opening 27 is provided in the housing ring 26 and an opening 19 is provided in the cylindrical mounting member 18 which are larger than, and aligned with, the cylindrical opening 12 in the backing plate 6, through which the transfer tube assembly 14 passes.

The transfer tube assembly 14 comprises an outer tubular member 50 with an enlarged head 52 at one end thereof, the enlarged head being formed by a flange member having an outer spherical surface 54, a short tubular section 56 and an adapter member 59 fixed to the outer end of the tubular section 56. The adapter member 59 has a short cylindrical section 58 extending towards the tubular member 50 while leaving an annular opening 60. Holes 62 extend through the short tubular section 56 to an annular space formed between cylindrical projection 58 and tubular section 56.

The adapter member 59 also has a spherical surface 63 formed on its outer surface with holes 65 extending between the outer end of the adapter and a recessed portion 67 within the adapter which opens into the short cylindrical section 58 forming an annular abutment 69. Spherical surfaces 54 and 63 have the same center. The other end of the outer tubular member 50 is slightly enlarged to form a small flange, said small flange having a groove therearound containing a seal member 71 comprising a piston contacting the inner surface of the cylindrical opening 12.

An intermediate tubular member 64 is located in tubular member 50 with one end being positioned within the cylindrical projection 58 against the annular abutment 69 and with its other end spaced from the end of tubular member 50 and having a flange 66 extending outwardly therefrom to a diameter equal to the small flange on the adjacent end of tubular member 50, said small flange and flange 66 being spaced to form an annular opening 51 for a purpose to be hereinafter described. The flange 66 has a groove therearound containing a seal member 68 comprising a piston contacting the inner surface of the cylindrical opening 12. Four spacer projections 70 extend outwardly from the free end of flange 66 for a distance approximately equal to the space between flange 66 and the small flange on tubular member 50.

An inner rod member 72 is located in the intermediate tubular member 64 with one end being formed as a cylindrical member 74 comprising a piston having a diameter equal to the flanges on the ends of the outer tubular member 50 and intermediate tubular member 64. Cylindrical member 74 has a groove therearound containing a seal member 76 contacting the inner surface of the cylindrical opening 12. The other end of the rod 72 is threaded and has a small flange 78 extending outwardly therefrom. The threaded portion of the rod 72 extends through an opening 79 in the tip of the adapter member 59 and is fixed thereto by a nut 80 with the flange 78 against the inner side of the adapter member 59. This connection spaces the cylindrical member 74 from the ends of the spacer projections 70 to permit a floating movement of intermediate tubular member 64. A substantially annular opening 53 is formed for a purpose to be hereinafter disclosed. The space 55 located between the free face of cylindrical member 74 and the end of opening 12 is vented by a passage 57 to the back of the backing member 6.

The enlarged head portion of the transfer tube assembly 14 is fixedly mounted between a manifold plate 82 which extends outwardly from the mounting plate 24 and a manifold housing 90 which is fixed to the manifold plate 82 and the mounting plate 24. This is done to provide a rigid support for holding the outer tubular member 50 against axial movement. The manifold plate 82 extends from mounting plate 24 adjacent the opening 27 on the cylindrical housing ring 26. An opening 91 is positioned therein of a size large enough to permit the free end of tubular member 50 to pass therethrough and extend into the opening 27. The outer surface of the manifold plate 82 has a spherical seat 92 located therein around the opening 91 to receive the spherical surface 54 of the enlarged head 52. The manifold housing 90 has a large recess 94 with a spherical seat 96. The recess 94 receives the projecting portion of the enlarged head leaving a space therearound while the spherical surface 63 engages the spherical seat 96. Seal members are located in each spherical surface.

It is mentioned hereinbefore that the manifold 90 is fixed to the manifold plate 82 and the mounting plate 24 which fixedly holds the enlarged head 52 of the transfer tube assembly 14 against axial movement. The spherical surfaces at each end, however, permit small angular movements to allow for any necessary movement of the free end of outer tubular member 50 within cylindrical opening 12. The free end of the intermediate tubular member 64 is permitted small angular movements due to the floating movement and the diameter difference between the outer surface of the free end of the intermediate tubular member 64 and the inner surface of the cylindrical projection 58. The free end of the rod member 72 is permitted small angular movements due to spring action of the rod; all of the movements of the members contacting the inner surface of the cylindrical opening 12 being such that substantially no load, either mechanical or hydraulic, is placed upon the backing plate 6 of the mirror assembly 1.

A recess 98 is formed in the manifold housing 90 to permit the threaded end of the rod 72 to project thereinto along with its nut 80. This opening also makes contact with the holes 65 which extend through to the recessed portion 67 within the adapter. The manifold housing 90 includes an inlet passage 100 for delivering a coolant flow to the recess 98 and an outlet passage 102 for directing the coolant fluid away from the recess 94. An inlet adapter 104 and an outlet adapter 106 are provided for connecting inlet and discharge lines to the manifold housing 90.

An inlet manifold 110 and an outlet manifold 114 are formed in the backing plate 6 in the cylindrical opening 12 at a location where they will cooperate with the substantially annular opening 53 and the annular opening 51, respectively, when the transfer tube assembly 14 is fixedly mounted in place. A passageway 112 and a passageway 116 connect the inlet manifold 110 and the outlet manifold 114, respectively, to the forward face of the backing plate where the cover plates 8 and 10 are mounted thereon. The cover plate 8 adjacent the forward face of the backing plate has an arcuate groove 118 located on one side thereof with an arcuate slot 120 being located on the opposite side thereof. The arcuate groove 118 and arcuate slot 120 are spaced to cover the desired area of the cover plate 10 on which a reflecting surface 200 is located. A plurality of grooves 122 connect the arcuate groove 118 to the arcuate slot 120. The arcuate groove 118 is positioned so as to interact with the opening of the passageway 112 on the forward face of the backing plate. An arcuate slot 124 is also located in the cover plate 8 located radially outwardly from the arcuate groove 118.

The cover plate 10 has an arcuate groove 126 positioned thereon to cooperate with the arcuate slot 120 of the cover plate 8. An arcuate groove 128 is located on the opposite side of the cover plate 10 and is positioned to cooperate with the arcuate slot 124 of the cover plate 8. A plurality of grooves 130 connect the arcuate groove 126 to the arcuate groove 128. The arcuate slot 124 is positioned so as to interact with the opening of the passageway 116 on the forward face of the backing plate. Prior art U.S. Pat. No. 3,854,799, referred to above, shows a reflecting device construction having cover plates fixed to a backing member.

OPERATION

During the requirements for coolant fluid in the laser mirror assembly, the coolant is delivered through the inlet passage 100 to the recess 98 where it passes through the holes 65 to the recess portion 67 within the adapter. The coolant flow then passes through the intermediate tubular member 64 and around the rod 72 to the substantially annular opening 53 where it is directed into the inlet manifold 110. It can be seen that pressure from the coolant reacts on the cylindrical member 74 which is rigidly fixed to the housing means 2.

The coolant flow is then directed into passageway 112 to the forward face of the backing plate where it enters the groove 118. The flow then continues down the grooves 122 to the slot 120 where it passes to groove 126 of cover plate 10. The flow then continues down the grooves 130 to the groove 128 where it is directed through the slot 124 to the passageway 116. The flow from the passageway 116 is directed to the outlet manifold 114 where it enters annular opening 51 to flow between the outer tubular member 50 and intermediate tubular member 64. This flow then continues outwardly through annular opening 60 to the holes 62 in the short tubular section 56. From the holes 62 the flow enters the recess 94 where it is directed out the outlet passage 102.

I claim:

1. In combination, a mirror, means for mounting said mirror, said mirror containing coolant passages, said mirror having a cylindrical hole therein extending inwardly from an opening in the side of the mirror, said cylindrical hole having a bottom surface, opposite said opening first passage means connecting said cylindrical hole to said coolant passages, said first passage means entering said cylindrical hole at a location between its opening and bottom surface, a first cylindrical section of said cylindrical hole being located between said location and said bottom surface, a second cylindrical section of said cylindrical hole being located between said location and said opening, a first piston in the first cylindrical section, means connecting said first piston to said mounting means for preventing said piston from engaging said bottom surface, tubular means extending into said second cylindrical section, said tubular means providing a passageway between the exterior of said mirror and said first passage means for directing a coolant therebetween.

2. A combination as set forth in claim 1 wherein said means connecting said first piston to said mounting means is a rod means.

3. A combination as set forth in claim 2 wherein said rod means is connected to a member having a spherical seat, said spherical seat being positioned in a spherical recess fixed to said mounting means.

4. A combination as set forth in claim 1 wherein a second piston is located in the second cylindrical section, said tubular means being connected to said second piston, means spacing said second piston from said first piston on the opposite side of said location where said passage means enters said cylindrical hole.

5. A combination as set forth in claim 4 wherein a second passage means connects said second cylindrical section of said cylindrical hole to said coolant passages, said second piston being positioned between said first passage means and said second passage means, a third piston in a second cylindrical section between said second passage means and the opening of the cylindrical hole, a second tubular means extending into said second cylindrical section, said second tubular means providing a passageway between the exterior of said mirror and said second passage means for directing a coolant therebetween.

6. A combination as set forth in claim 5 wherein said second tubular means is connected to said member having a spherical seat.

7. A combination as set forth in claim 4 wherein said tubular means and second piston have limited axial movement between said member having a spherical seat and said first piston.

* * * * *